Patented June 30, 1931

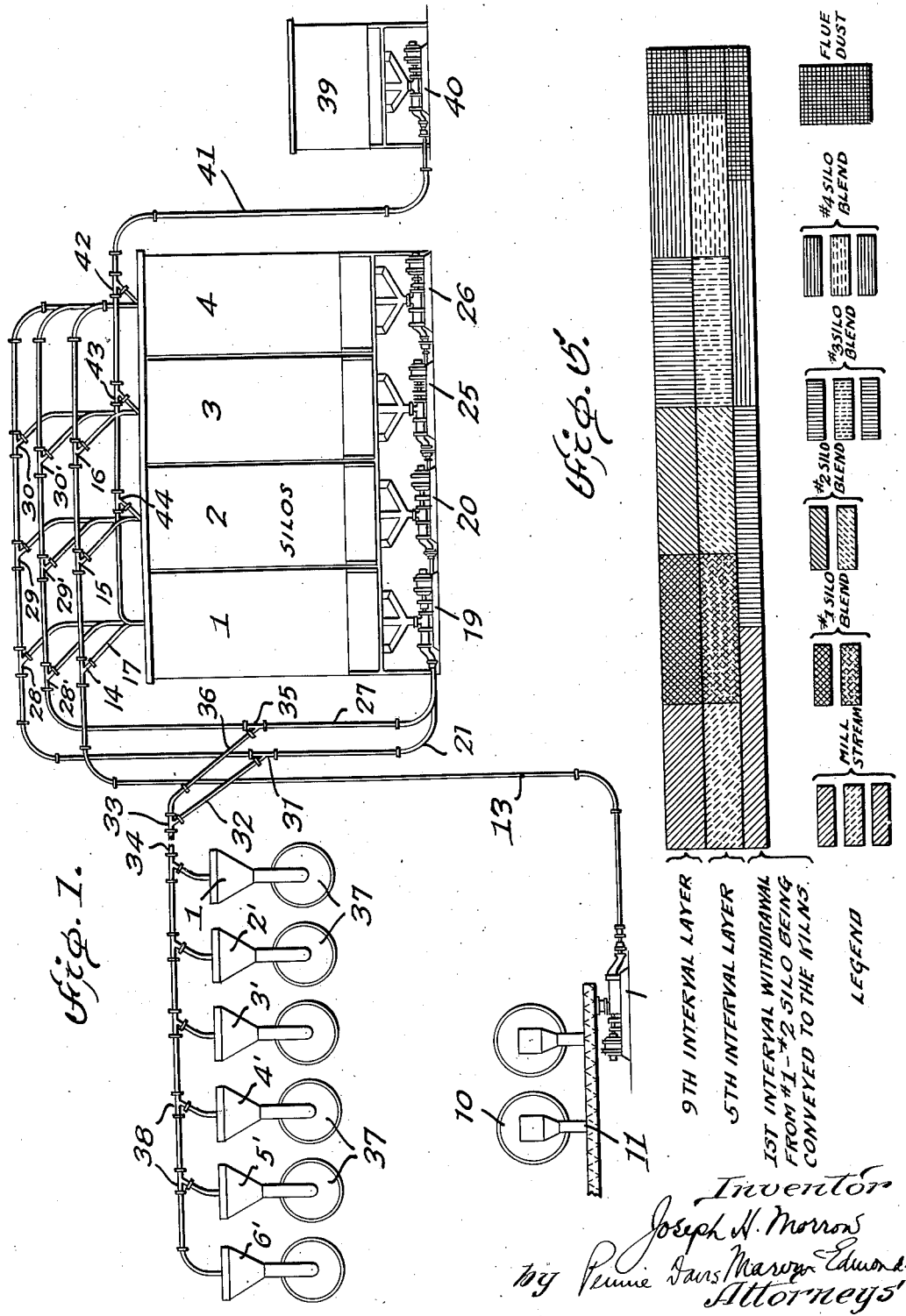

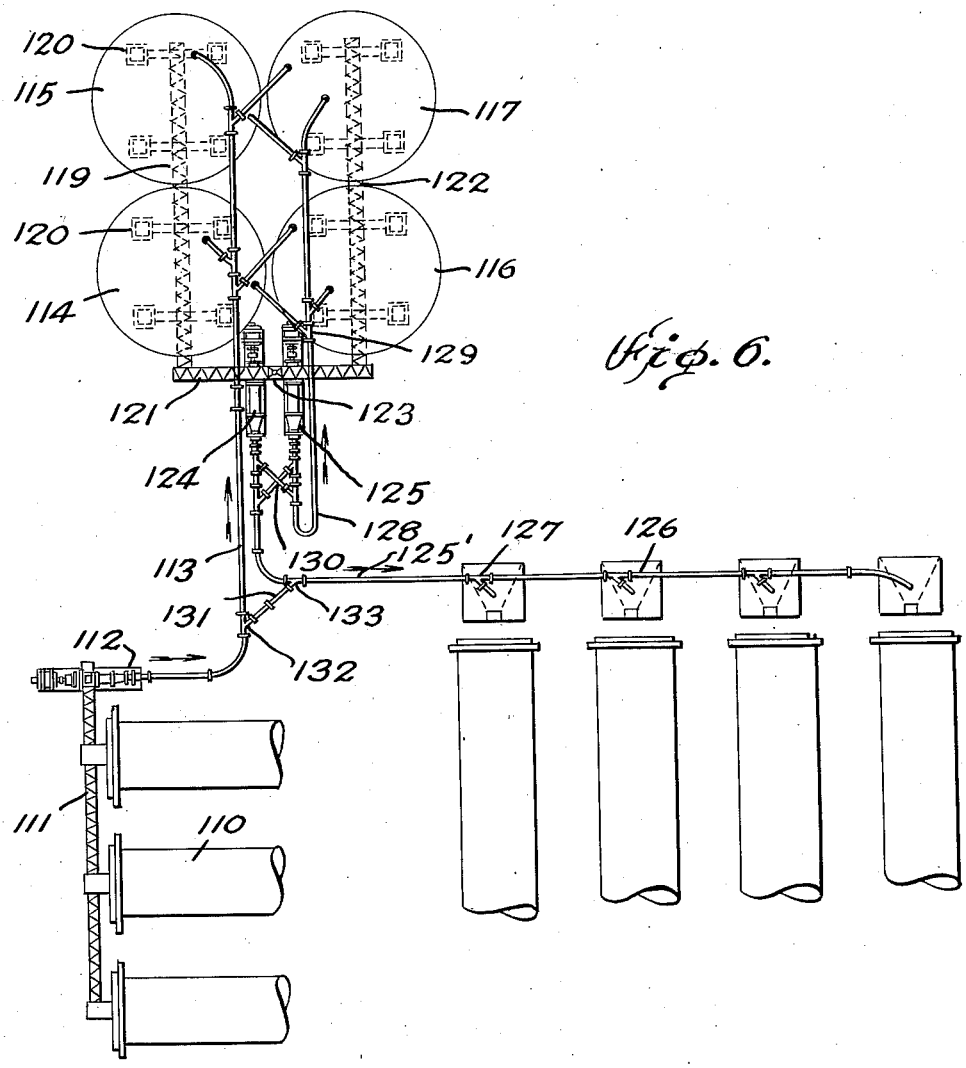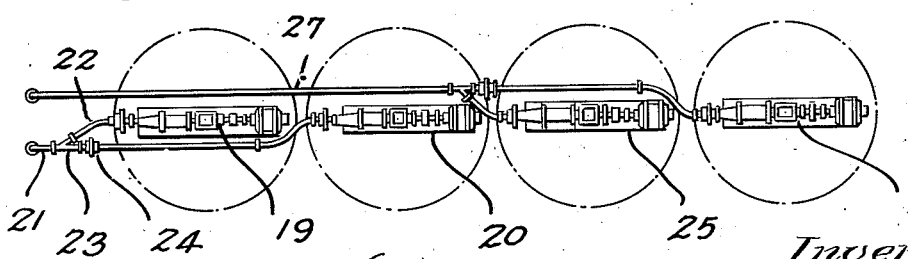

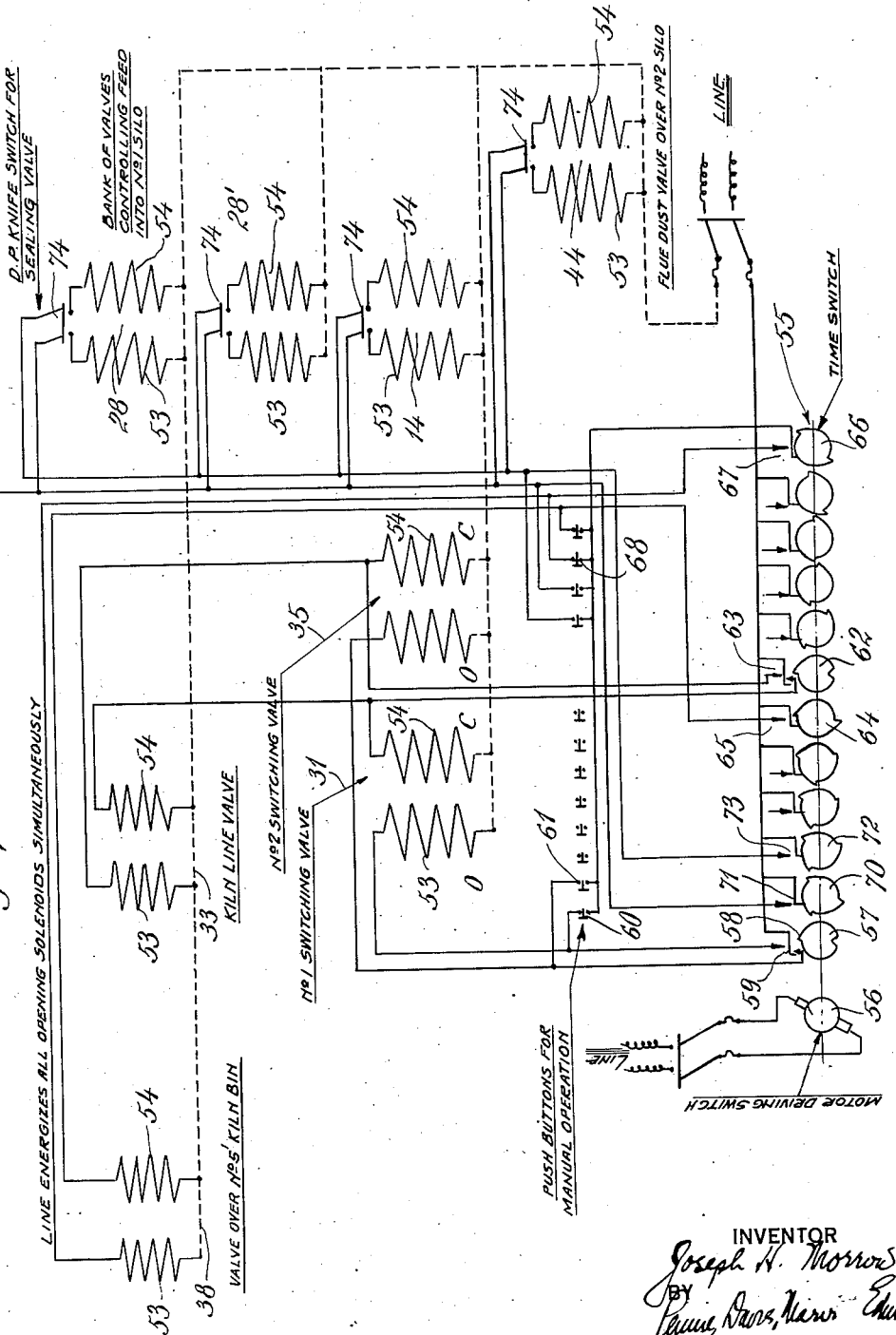

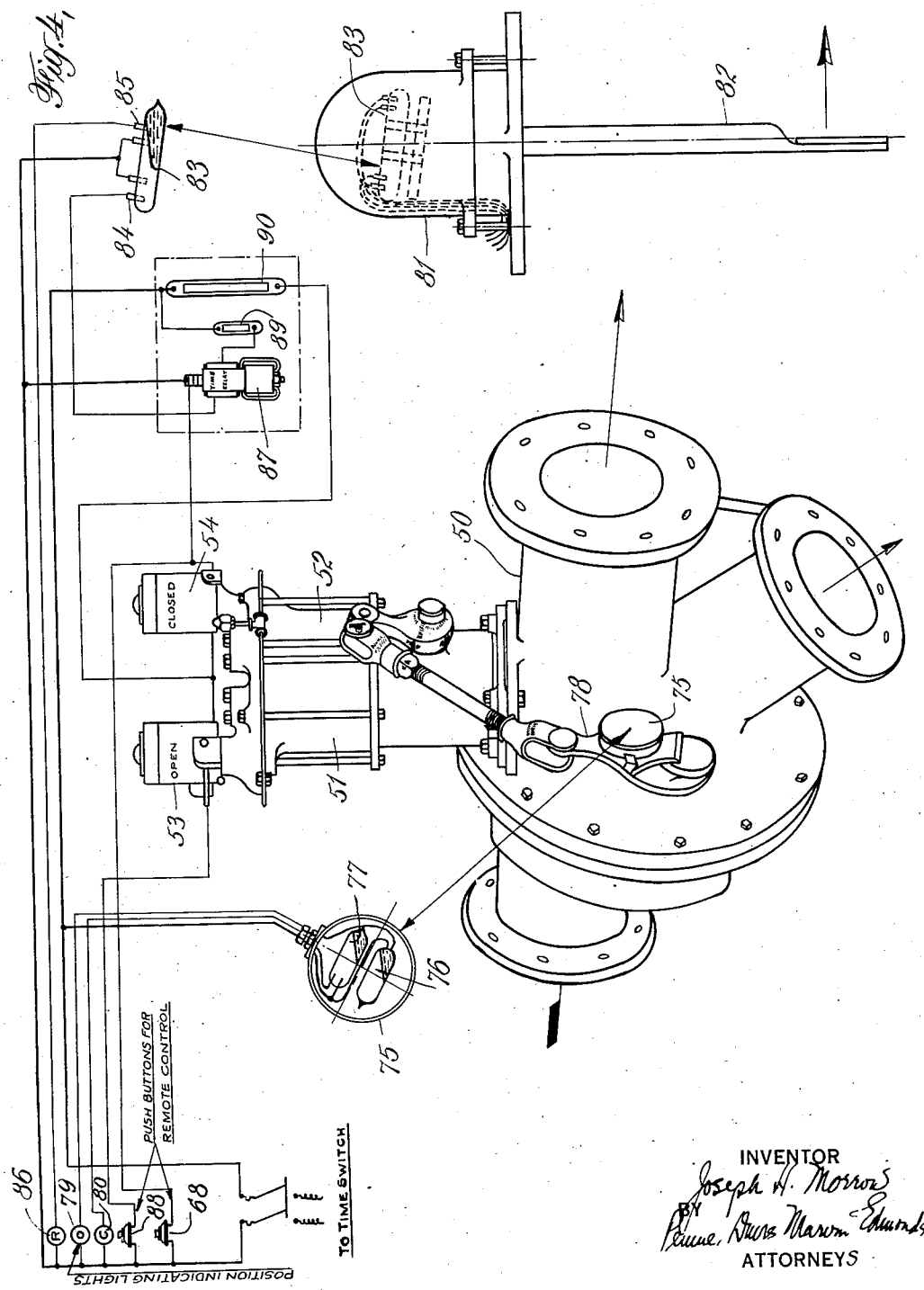

1,812,604

UNITED STATES PATENT OFFICE

JOSEPH HUMPHREYS MORROW, OF CATASAUQUA, PENNSYLVANIA, ASSIGNOR TO FULLER COMPANY, OF CATASAUQUA, PENNSYLVANIA, A CORPORATION OF PENNSYLVANIA

MIXING AND BLENDING SYSTEM

Application filed October 3, 1928. Serial No. 310,011.

This invention has to do with mixing and blending pulverized or finely divided dry materials of varying physical and chemical characteristics for the purpose of producing an ultimate mixture having or approximating a desired predetermined analysis, either chemical or physical or both. More specifically the invention is concerned with a method by which such mixing and blending operations may be performed, and an apparatus by which the new method in its preferred and various modified forms may be carried out.

According to the new method, the operations of mixing and blending are carried on in such manner that the particles of the various materials are brought into intimate contact without classification according to specific gravity or fineness, so that a physical mixture is produced suitable for certain chemical processes and of such character that chemical reactions brought about by the application of heat, such as calcining, sintering, and fusion processes, or in solution with or without the application of heat, are facilitated. Furthermore, the new method permits the blending of two or more mixtures of materials, at least one of which will have an excess and another a deficiency with respect to certain necessary ingredients, in such proportions as to produce an ultimate mixture of thoroughly mixed and blended materials of the desired analysis.

The various steps of the new method may be performed by apparatus presently to be described in which a minimum of supervision is required, the control of the flow and distribution of the various materials being automatic, although provision is made for modifying under remote control the sequence and duration of operation of the several parts of the complete system, so that correction may be made for unexpected changes in the characteristics or chemical content of the separate ingredients which go to make up the mixture.

While my invention is applicable for mixing and blending dry pulverized materials such as cement raw material, pigments, fertilizers, acid phosphate, dyes, and the like, it will be described in detail hereinafter for purposes of illustration in connection with its application to the mixing and blending of dry cement raw materials for the dry process of cement manufacture, though it is to be understood that it is not limited in utility to this specific service.

In the manufacture of Portland cement, it is essential that the raw materials be thoroughly mixed and blended before burning in order to produce sound cement of uniformly high quality. Improperly mixed raw materials not only contribute to unsoundness and low strength in cement but often delay production due to the formation of clinker rings in the kiln and to variation in feeding. The difficulty in obtaining and maintaining accurate mixtures of dry materials is due to various reasons, such as the lack of uniformity in the material itself, the variation between samples and the mass, changes in analysis as the materials are processed, stored and tranported, and mechanical difficulties in both handling and proportioning.

Influenced largely by these difficulties, most of the newer cement plants practice the so-called wet process in order to control the analysis within the necessary limits. In accordance with the wet process, the materials are ground in water and delivered as a thin liquid to correction tanks. These tanks are usually divided into three groups. In one group the wet materials or slurry may be deficient in one or more of the necessary ingredients, and in the second group there will be an excess of the same ingredients. These materials are then proportioned and delivered to the third group of tanks where they are thoroughly mixed by agitation. Although this method permits close control of the analysis, it has the disadvantage of requiring much more elaborate and complicated apparatus, and close supervision. In addition, more fuel must be burned to drive off the water before the material can be converted to cement clinker.

My invention does not follow the practice of the wet method, but takes advantage of certain characteristics of dry pulverized materials to effect a mixture in a very simple manner. In one application of the method, however, to be described hereinafter, correction may be accomplished in a similar manner to that used in the wet process, but this practice will ordinarily be unnecessary. By my method, therefore the economical advantages of the dry process can be retained and an equally sound uniformly high quality cement can be made at lower cost under more simple and convenient operating conditions.

The practice in obtaining the mixture of raw materials varies in dry process plants and depends largely upon local conditions, such as the location, composition and nature of the materials used, namely the limestone, cement rock, clay, shale, etc. At some plants, a fairly good blend can be made in the quarry itself before crushing, while in others the materials are crushed and stored separately and the desired mixture obtained by proportioning the materials as they are withdrawn from storage before final grinding. It is also common practice to mix the materials so that the composition is either excessive or deficient in one or more ingredient such as lime, and to control the mixture either by adding clay or shale if the lime is high, or limestone if it is low, before final grinding.

It is theoretically possible to obtain a supply of finely ground materials of the desired composition and suitable for burning by any of the practices described above, but it will be apparent that although the entire bulk may have a proper composite analysis, it by no means follows that the materials as actually supplied to the kilns from minute to minute or from hour to hour will have the desired analysis and contact between particles. This is due to a number of factors over which the cement chemist has little or no control. For instance, the materials properly blended at the quarry may separate during crushing, milling and handling due to differences in the time of grinding between the hard and soft materials and to a natural tendency of crushed materials to classify both in storage and handling in accordance with fineness and weight. In addition, when the crushed materials are withdrawn from storage, it is almost impossible for mechanical reasons to mix them in such manner that the final composition will show a uniform analysis as they are delivered to the mills. The materials finely ground and as discharged from the mills may, therefore, vary widely from the proper composition from time to time even though the entire composite bulk may be accurate.

This continuous variation in analysis of the materials as discharged is ordinarily referred to as "the mill stream error", and it is the object of my method to eliminate or reduce this error, rather than to modify particularly the practice in obtaining the original raw material mixture as described above, although standard practice may be changed under certain conditions as described hereinafter.

While the method can be performed between preliminary and final raw grinding in plants practicing two stage grinding, it will be described in its application to the mixing and blending of finely ground materials between the mills and the kilns.

In practicing my method, I prefer to make use of the so-called "Fuller-Kinyon conveying system" (see Kinyon U. S. Patents Nos. 1,553,539 and 1,652,281) for the transportation and distribution of the materials, since this system has the peculiarity of transporting and discharging the materials in an aerated and fluent condition such that they assume a flat or hydrostatic level in the bins or silos with no tendency to segregate or classify according to weight or fineness. Also the transport pipe lines of this system may be interconnected to provide for any desired distribution and automatic control of material flow can be arranged in predetermined sequences as described hereinafter.

One of the factors contributing to the formation of the desired mixture in the practice of my invention is the natural tendency of dry pulverized materials, when withdrawn by gravity from storage bins or silos, to form "pipes" or "rat holes" above the discharge spouts throughout the entire height of the material in the bin. The materials thus discharged are the product of almost all levels from the top to the bottom of the bin as the material moves inwardly and downwardly through the rat holes rather than the lowermost material in storage.

In general, my invention involves conveying the mill stream to storage in at least three and preferably four or more bins or silos, the flow of materials into the separate bins being intermittent and in a definite sequence. This intermittent distribution is preferably under timed automatic control of the branch line valves or other distributing apparatus, operating so that the bins receive the mill stream consecutively for short periods, each bin receiving a succession of thin flat layers of the materials. The thickness of these layers will depend on local conditions such as the diameter of the bins, the maximum normal mill stream error and the number of bins available to serve as mixing tanks, and may vary, for example, from three inches to two feet, being modified at will by changing the rate of delivery or the duration of operation. In order to enhance the mixture this stored material may be re-circulated and in addition, other materials such as flue dust may be blended with the mill stream and circulated materials.

After delivery of the mill stream to the silos has continued for some time and a number of layers have been formed in each bin, mixing additional to that accomplished by the running together of the layers may be effected by the circulation of the stored materials. When materials are to be circulated, they are withdrawn simultaneously from all the silo bins at the same rate and the mixture so produced is circulated and discharged into one bin after another, at the same time and in the same sequence as the mill stream. Flue dust may be discharged into the bins at the same time.

The simultaneous discharge of the mill stream, circulated material and flue dust into the same bin causes additional mixing due to the turbulent discharge of these fluent materials and their natural tendency to mix as they seek their level in forming the layer in the bin. Each layer so formed is therefore a partial mixture of the discharged materials. After the materials have been circulated and the mixture is completed, they are withdrawn and delivered to the kiln bins under the same timed automatic control of distribution to form similar thin, flat layers in these bins which layers run together during withdrawal by the kiln feeders.

When the entire system is operated under its automatic control, in normal operation the primary factors contributing to the ultimate mixture are: (1) the spread of the mill stream error over the number of silos available due to the alternate distribution; (2) the time interval of distribution and the rate of delivery which govern the thickness of the layers; (3) the number of layers in the mixing bins; (4) the number of withdrawal spouts below the bins; (5) circulation and the number of streams of material discharging into a bin under turbulent conditions; (6) intermittent and alternate delivery to the kiln bins and withdrawal under similar layer conditions. These mixing factors are not arbitrary and are variable under different physical conditions depending upon the nature of the installation, as will be better understood from the specific description hereinafter.

If the mill stream error variation does not fluctuate widely, it is unnecessary to circulate the materials in storage and if the error is nominal due to fortunate quarry conditions prior to milling, the storage bins may be bypassed, and the materials delivered directly to the kiln bins under timed automatic control in intermittent sequence. A fairly good mixture will result as the variation will be reduced by reason of the number of kiln bins available to receive material, the number of layers in each bin and the thinness of the layers, all of which cooperate to produce a mixture of uniform characteristics.

If a large quantity of rock is sent from the quarry and its analysis indicates that it is not suitable for the mixture, the system may be modified by remote control to divert this material into one bin reserved for this purpose. It may then be withdrawn and utilized in proper proportions with materials in the other storage bins to arrive at the proper composition. For example, if the material delivered to the special bin is deficient in lime, the chemist can increase the lime content in the remaining bins, and by proportioning the withdrawals from the several bins a final accurate mixture will result.

If these conditions are of frequent occurrence, the system can be arranged for correction as well as mixing in a manner similar to that used in the wet process. Under such conditions, at least six mixing bins should be available and the automatic control arranged to deliver first to one group of three bins in the same manner as described above and then to the second three bins operating as a unit. In one group of bins a mixture will be created that will be deficient in lime for example, while in the other group of bins, the mixture will contain an excess of lime. Withdrawals made from these two groups of bins will then be so proportioned that the final composition will be accurate and the final mixing will be obtained by intermittent delivery to the kiln bins or to a reserve storage bin.

For a better understanding of the novel method and of apparatus by which it may be carried out conveniently, reference may be had to the accompanying drawings, in which, Fig. 1 is a schematic diagram of a preferred form of the invention for mixing and blending pulverized materials, Fig. 2 is a plan view showing the pipe line and pump layout below the silos shown in Fig. 1, Fig. 3 is a partial wiring diagram of the valve operating circuit, Fig. 4 is a detailed diagram of the circuit for operating one of the automatically controlled pipe line valves, Fig. 5 is a diagram of the layer composition of three successive layers in one silo, and Fig. 6 is a schematic diagram showing a slightly modified layout of the system.

Referring first to Fig. 1, four blending or correction silos are shown, hereinafter referred to as blending silos or bins designated 1 to 4 inclusive. The mill stream is conveyed to these silos from the pulverizer mills 10 by the collector screw 11 delivering to the pump 12 connected to transport line 13. Delivery to the separate silos is under control of valves 14, 15, and 16, each valve having a suitable branch line such as that shown at 17 leading to its silo. The materials are withdrawn from the silos preferably through at least five spouts which terminate in a common discharge pipe indicated schematically at 18. A pump is connected to each pipe arranged to deliver the material as follows.

The pump 19 receiving material from the silo 1 is connected to the transport line 21 through a pipe bend 22 and an inlet fitting 23. In order to simplify the system and reduce the total number of transport lines, the pump 20 also transports materials withdrawn from its silo 2 through the transport line 21. To the rear of this inlet fitting 23 is a hand operated cutoff valve 24 installed to prevent material from pump 19 working backwardly toward pump 20, if the latter is shut down. Materials from silos 3 and 4 are withdrawn in a similar manner and are transported by pumps 25 and 26 through their common transport line 27.

When circulation of the materials is desired in order to effect a more complete mixture, the materials may be withdrawn from the silos 1 to 4 inclusive by means of the pumps and transport lines and delivered to the silos. For this purpose, the line 21 is arranged to lead to the tops of the silos and is provided with switching valves 28, 29, 30 by which the flow of material to the several silos may be controlled. The line 27 similarly leads to the tops of the silos and is provided with similar control valves 28', 29', 30' and branch lines.

The materials withdrawn from the silos through the lines 21 and 27 are conveyed to kiln bins, the line 21 having a control valve 31 and a branch line 32 leading to a valve 33 in the kiln transport line 34. The line 27 is similarly connected to the kiln transport line 34 at the valve 33 through a control valve 35 and a branch line 36. There are shown arbitrarily six kilns 37 with their respective bins designated 1' to 6' inclusive, and the flow of material from the line 34 to the respective kiln bins is controlled by a plurality of two-way valves 38, one for each of the kiln bins except the last in the series. From each of the valves 38, a branch line leads to the respective kiln bins.

If other materials are to be blended with the mill stream and the product stored in the four silo bins, a separate bin 39 may be provided for storing this material, which may be flue dust for example. The flue dust is withdrawn by mechanism similar to the apparatus under the silo bins and includes a pump 40 with its transport line 41 which delivers the dust to anyone of the four silos through valves 42, 43 and 44.

As an example of the method of blending and mixing the several materials, the following is given.

Materials discharged from the mills are delivered under timed automatic control such that small quantities of material will be first discharged into silo 1 and then successively into the other three silos, whereupon the flow will be diverted back to silo 1 and the sequence repeated. At the same time a relatively small quantity of flue dust, which is usually employed in relatively small amounts will be delivered to the silos in exactly the same sequence as the mill stream.

In the first period or interval while mill stream and flue dust are being discharged into silo 1, withdrawals of materials from that silo and silo 2 are being made by pumps 19 and 20 which deliver the materials so withdrawn through transport line 21, branch line 32 and transport line 34 to the kiln bins under control of valves 38. These materials are discharged into four kiln bins 1'-4' inclusive in sequence, each kiln bin receiving for a period one quarter as long as the period of withdrawal from the silos. During the first period of operation, kilns bins 5' and 6' do not receive but this is taken care of in a later interval when the order of supply to these bins is 5', 6', 1', and 2'. While silo 1 is receiving mill stream and flue dust, materials are also being withdrawn from silos 3 and 4 and delivered by pumps 25 and 26 through line 27 and valves 28' to silo 1.

In the next interval of operation, silo 2 receives mill stream and flue dust and withdrawals from silos 3 and 4, while withdrawals from silos 1 and 2 are being delivered to kiln bins 1', 2', 5', and 6'. Following this, silos 3 and 4 are successively supplied with mill stream, flue dust, and materials withdrawn from silos 1 and 2. During these periods, no materials are supplied to the kilns but withdrawals from silos 3 and 4 are delivered back to one or the other of them depending on the interval.

In the fifth interval of operation, silo 1 receives mill stream, flue dust, withdrawals from silos 3 and 4, and withdrawals from silos 1 and 2 which are diverted from the kiln bins to this silo. In this interval, therefore, silo 1 receives four independent streams of six materials or separate mixtures. In the sixth interval, silo 2 receives materials from the same sources and in the same manner.

In the seventh and eighth intervals, withdrawals from silos 3 and 4, respectively, are delivered to the appropriate kiln bins in sequence, while mill stream, flue dust and withdrawals from silos 1 and 2 are delivered to silos 3 and 4 in sequence. In the ninth to twelfth intervals, all materials are delivered to silos 1, 2, 3, and 4 consecutively. The twelfth interval is the last in the sequence, and after that, the sequence of operations is repeated.

It will be noted that in the method described, the silos are supplied one after another and while either of the first pair is receiving, materials withdrawn from the second pair are supplied thereto, and vice versa. During those periods in which the kiln bins are supplied, the materials delivered thereto are withdrawn from a pair of silos, one of which is receiving. The silos employed to practice the method described are of considerably larger capacity than the kiln bins and the milling equipment used has a greater output than can be handled by the kilns, so that supply to the kiln bins may be shut off during certain intervals, thus permitting circulation among the silos. The excess capacity of the silos and mills also makes it possible to set up a reserve in storage against a breakdown and permits the mills to be operated in periods when power charges are lowest.

While the method of supply, circulation, and feeding to the kiln bins above described is highly satisfactory to effect blending and mixing of the raw materials, it will be understood that it is described merely as illustrative and many variations in and departures from it may be made under differing local conditions. Also it will be apparent that the deliveries to the kiln bins are not always exactly as described since in certain intervals when delivery to these bins would normally occur, the bins may be still filled for one reason or another. In that event, the materials which would have been supplied to them are circulated among the silos.

In order to make clear the character of the mixture in the different layers delivered to the silos, reference may be made to the diagram in Fig. 5, showing the composition of the mixtures delivered to silo 1 in the first, fifth and ninth intervals of operation. Below the main diagram is a legend graphically representing the varying composition of the materials in the mill stream and the different blends. In this legend, the mill stream composition is indicated as varying from minute to minute, and the materials withdrawn from the silos are in each instance of variable composition since they are produced by the running together of a plurality of layers and the mixing of mill stream and flue dust with the stored materials. It follows, therefore, that although the materials in the fifth and ninth layers are composite products derived from the same source, they may vary considerably in analysis. The flue dust does not vary much in composition and has been represented as of the same composition throughout.

The operation of the system will be clear by reference to Figures 3 and 4 which contain wiring diagrams showing how automatic and remote control is accomplished. In connection with these figures, it is to be borne in mind that the valves operate in groups and, consequently, a number of circuits can be controlled from the same source. These diagrams are limited to the essentials of the circuit and only such typical valves and operating mechanism therefor are shown as are necessary for a complete understanding of the system as a whole.

In Figure 4, there is shown a standard type of two-way valve 50, which is operated pneumatically by cylinders 51 and 52 containing pistons connected to the moving parts of the valves. The supply of air to these cylinders is controlled by valve operating solenoids 53 and 54. The particular valve and its operating mechanism illustrated are not specifically a part of the present invention.

When the various valves of the system are to be operated at desired intervals and in a selected sequence to bring about mixing and blending in the manner previously described, these valves may be controlled by a device such as a drum switch, generally designated 55, (Fig. 3). This switch includes a plurality of rotating cams driven by a suitable motor 66 through reduction gearing and the gear ratios employed determine the time intervals in the sequence of operations. Two valves designated No. 1 and No. 2 switch valves and corresponding respectively to valves 31 and 35 (Fig. 1) are shown, these valves controlling the flow of material from main transport lines 21 and 27 to branch lines 32, 36, connected to transport line 34 leading to the several kiln bins. Each of the valves 31, 35 is equipped with an opening solenoid 53 and a closing solenoid 54, by which the supply of air to the operating mechanism of the valves is controlled. The drum switch 55 is provided with a cam 57 having a projection 58 which when moved into proper position, closes the upper contact of a switch 59, which closes a circuit through the opening solenoid 53 of No. 1 switch valve, moving this valve to open position, i. e. a position in which the branch connection is open, so as to permit material to flow from transport line 21 through the valve into the branch line 32. When the time switch has rotated 180°, a depression in the cam 57 opposite the projection 58 causes the switch 59 to close a circuit, by which energy is supplied to the opening solenoid 53 of No. 2 switch valve. With the arrangement shown in Figure 1, the operation of the valves in the manner described results in materials being delivered first from silos 1 and 2 to the kiln bins and then after an interval from silos 3 and 4. Each of the valves designated No. 1 and No. 2 switch valves may be operated by remote control push buttons 60, 61, if some other sequence of operations than that provided by the switch 55 is desired. At the proper intervals, the No. 1 and No. 2 switch valves are closed by the operation of the cam 62, similar in construction to the cam 57 and operating a switch 63, which controls separate circuits through the closing solenoids 53 of the two valves.

In Figure 3, there are shown the circuits for supplying current to the solenoids of the kiln line valve 33 and to one of the valves 38 associated with a kiln. The valve illustrated is that over kiln No. 5'. The valve 33 through which materials passing through valves 31 and 35 enter the transport line 34 to the kilns is provided with opening and closing solenoids 53 and 54, respectively, and the opening solenoid 53 of valve 33 is connected in parallel with the closing solenoid 54 of No. 2 switch valve, and the closing solenoid 54 of valve 33 is connected in parallel with the closing solenoid 54 of No. 1 switch valve. With this arrangement, it will be apparent that when No. 1 switch valve or valve 31 is closed, materials flowing through the line 21 pass the valve 31 and are delivered to one or the other of the silos. When the valve 31 is closed to its branch, the valve 33 is similarly closed to its branch, and the line 32 is thus shut off at both ends. When No. 2 switch valve or valve 35 is closed to its branch, the valve 33 is closed to the line 36 but open to the branch 32.

In order to simplify the diagram, the control circuit for only one of the kiln line valves is shown and this valve is provided with an opening solenoid 53 and a closing solenoid 54, the valve being opened by the action of a cam 66 in the switch 55, which cam has two surface projections. When these projections come into the proper position, they close a switch 67 which energizes the circuit which includes the opening solenoid 53 of the valve 38, and this valve is closed by means of the cam 64 in the drum switch which closes the circuit through the switch 65, which controls the closing solenoid 54 of the valve 38. The push button 68 affords means for opening the valve and permits the chemist or operator to change the sequence of operations at a remote control point.

The valves for controlling the flow of materials into the silos operate simultaneously in groups. When materials are to be delivered to silo No. 1, the valves 14, 28 and 28′ are open through their branch lines, while the valve 44 in the flue dust line is closed to its branch but open to the end of the line. If materials are to be supplied to silo No. 1 through the lines 13, 21, 27 and 41, valves 14, 28 and 28′ will be opened and valve 44 closed, and this operation is accomplished by means of the cam 70, which operates the switch 71. When this switch is closed by the cam, current is supplied to the closing solenoid 54 of valve 44 and to the opening solenoids 53 of the valves 14, 28 and 28′. Valves 14, 28 and 28′ are opened and valve 44 closed to its branch by the operation of cam 72, which controls the action of switch 73. When this switch is closed by its cam, current is supplied to the opening solenoid 53 of valve 44 and to the closing solenoids 54 of the valves 14, 28 and 28′. The circuits for each of these valves are controlled by double pole switches 74, so that the valves may be maintained in position to prevent the flow of material into a silo, if it is desired to maintain that silo empty.

When material is to be supplied to the No. 1 bin, all of the valves 14, 28 and 28′ above that bin are opened to their branches, while the main lines at and beyond these valves are closed. At the same time the valves above all the other silos are opened but the material flows into the No. 1 silo since this is the first in the series connected to transport lines 21 and 27. Accordingly, the switch 71 controls a line which energizes the opening solenoids of all of these valves above the silos. When it is desired to deliver material to silo No. 2, the valves 14, 28 and 28′ above that No. 2, the valves 14, 28 and 28′ above that silo are closed, while all the other silo valves remain open. Since under these conditions the valves 15, 29 and 29′ are the first open valves reached by the material, all of the material passes through the branch lines of these valves and is delivered into silo No. 2.

The same situation holds true with respect to the valves 38 above the kiln bins. When material is to be delivered into kiln bin No. 1′, all of the valves are opened simultaneously by the energization of their opening solenoids 53. When kiln bin No. 1′ has received the desired amount of material, the valve 38 above this bin is closed to its branch and material passes on beyond that bin, but is immediately diverted through the next valve 38 above bin No. 2′. It will be understood that in all of these valves when a valve is in open position, the branch leading from the valve is open and the main line at and beyond that valve is closed.

In Figure 4, there is illustrated a schematic arrangement of one kiln bin valve 38 corresponding to valve over No. 5′ bin in Figure 3. There are also shown certain supplementary circuits provided so that the system will not deliver materials to the several kiln bins after these bins have become filled. These kiln bins also have certain control circuits with lamps, which are duplicated for various valves or groups of valves.

The valve 50 is provided with a valve position indicator switch 75 mounted on the valve throwing lever 78 and including mercury tube or mercoid switches 76 and 77. When the valve is in the open position a circuit is closed through mercoid switch 76 controlling an indicator lamp 79 mounted on the control and signal panel. This lamp may be a white bull's eye. When the valve is in its closed position, a circuit is closed through mercoid switch 77 and this circuit includes a lamp 80 which may also be a white bull's eye appropriately marked on the signal panel. The operation of the valve brings about a movement of the valve operating lever which causes the switch 75 to tilt to break the circuit through one of its mercury tubes and close the circuit through the other.

When the material in each kiln bin reaches a desired high level, a high bin signal shown diagrammatically at 81 is operated by the flow of material against a paddle 82 suspended in the bin. Above the pivot of the paddle is mounted a mercoid switch 83 provided with two sets of contacts 84 and 85. When the material level in the bin is below the paddle, the latter hangs vertically and by reason of the normally inclined position of the switch 83, the mercury therein closes the circuit through contacts 85 causing a red lamp 86 on the control panel to be illuminated, indicating that the bin is in condition to receive material. When material is delivered to the bin and reaches a predetermined level, the paddle is moved in the direction of the arrow (Fig. 4) causing the mercoid tube to tilt so as to break the circuit through contacts 85, and close the circuit through contacts 84. The circuit through contacts 84 operates the time relay designated 87 which energizes the closing solenoid 54 associated with the valve through which material is supplied to the bin, thereby shutting off the flow of material through that valve. When the circuit through contacts 85 is broken, the red lamp 86 is extinguished, indicating that the bin is full. If desired a second switch similar to switch 83 may be mounted on the paddle to control a circuit to reopen the valve when the material in the bin falls below the desired level. In the circuit which includes the opening solenoid 53 of the switch valve 50 is a push button 88 by which the valve may be reset or positioned manually.

The time relay 87 operates only after a suitable time interval, so that it functions only after the paddle 82 has become stationary in a position resulting from a high level of material in the bin. When direct current is used with this system it may be necessary to employ resistors 89 and 90 in the manner illustrated, while if alternating current is used, these resistors are ordinarily not required.

While the arrangement illustrated is of the preferred type, it will be apparent that it may be modified in many respects to effect mixtures according to a different procedure from that illustrated. For example, to carry the mixture to a further degree, each of the pumps 19, 20, 25 and 26 may be provided with its own pipe line, thus permitting separate control of withdrawals from each of the silos, and return of such withdrawals to any selected silo. If it is desired to simplify the arrangement, all four of these pumps may be connected to a single pipe line. In the latter event, it would probably be convenient to provide a collector screw below all of the silos discharging to a single pump. The latter arrangement in which all of the silos deliver to a common transport line, lacks to a considerable extent the flexibility of control which is desirable and is subject to the disadvantage that the operation of the entire system might be stopped by the failure of a single element.

In Figure 6 there is shown a somewhat modified layout, in which the materials discharged from the pulverizer mills 110 are collected by a screw 111 and delivered by a pump 112 connected by a line 113 to the several silos 114, 115, 116 and 117, which serve as blending and correction tanks. The transport line 113 is provided with valves such as that indicated at 118 by which the flow of material into the bins may be controlled in accordance with the procedure previously described. Below the bins 114 and 115 is a collector screw 110 which receives material delivered through the spout connections 120 from these silos, and delivers it to a cross conveyor screw 121. A similar collector screw 122 under bins 116 and 117 delivers to another portion of the collector screw 121, this screw having right and left hand flights at its opposite ends so that the materials discharged thereto are led to an inverted Y spout 123, which leads to the pumps 124 and 125. The pump 124 is connected to a kiln bin transport line 125' leading to the several kiln bins 126 under control of valves 127, while the pump 125 is connected to the line 128 leading back to the silos under control of valves 129. Between the pipe lines 125 and 128 are provided cross-over connections 130 so that the operator may use either pump for delivering materials to the kiln bins or returning materials withdrawn from the silos back to the silos to effect further mixing.

The arrangement illustrated in this figure permits the operator to use both pumps simultaneously, one for conveying to kiln bins and the other for circulation of materials from storage back to storage. Also, with this arrangement the spout 125 is provided with the usual slide gates so that one pump may be shut down while the other operates the system.

Under certain conditions when the mill stream error is relatively small, materials may be transported directly from the mill stream pump 112 through the branch line 131 into the kiln bin transport line 125 under the control of valves 132 and 133. The valves 126 may be operated in this system by automatic control mechanism such as the motor driven switch 55, so that delivery to the kiln bins is in sequence and for short intervals. In that way a fair degree of mixture will result in the materials withdrawn from the kiln bins due to the running together of the several layers therein. In this way, the mill stream error is spread over the several kiln bins and this error can be reduced by making the layers in each bin thin.

It will be apparent that with any of the arrangements previously described, one silo may be reserved for materials which differ widely from the desired analysis and the operation may withdraw materials from this silo in proper proportions by the operation of remote control switches.

In the foregoing specification the invention is described as it would be practically applied in connection with the manufacture of cement. It is to be understood that the utility of the invention is by no means limited to that particular use, but the principles thereof may be applied in the production of mixtures of predetermined physical and chemical analyses incident to the manufacture of many products other than cement. Typical examples of such uses of the invention have been stated herein and no doubt other uses of the invention may be found hereafter. The order in which the various steps of the method of the invention are carried out may vary according to the use to which it is put, and the degree of uniformity in the final mixture that is desired. Accordingly, I do not desire to impose limitations on the claims herewith presented by reason of the specific description of its application herein given.

What I claim:

1. A method of mixing and blending pulverulent materials which comprises delivering materials to a plurality of bins consecutively to form a series of relatively thin horizontal layers of varying analysis in each bin, withdrawing materials simultaneously from a pair of said bins and delivering them to a discharge bin to form a relatively thin horizontal layer therein, and varying the withdrawal to include all of said bins first mentioned in consecutive pairs.

2. A method of mixing and blending pulverulent material which comprises delivering the material to a group of bins consecutively to form a series of relatively thin horizontal layers in each bin, withdrawing material simultaneously from the bins of another group previously filled with similar layers of the material, and alternating the delivery to and withdrawal from the bins of the two groups.

3. A method of mixing and blending pulverulent material which comprises delivering the material to a group of silos while withdrawing material simultaneously from silos of another group previously filled and delivering said material withdrawn to a receiving bin to form a relatively thin horizontal layer therein, and alternating delivery to and withdrawal from the silos of the two groups.

4. A method of mixing and blending pulverulent materials which comprises delivering the materials from sources of supply thereof into a group of bins while withdrawing materials from the bins of another group previously filled and delivering said materials to the bins of the first group, and, during such delivery to the bins of the first group, withdrawing materials therefrom and delivering them to a receiving bin.

5. A method of mixing and blending pulverulent material which comprises delivering said material from a source of supply first to a plurality of bins in a group and then to the bins of another group, and during such delivery withdrawing material from one group and delivering it to a receiving bin and withdrawing material from the other group and delivering it to the group of bins which is receiving from said sources of supply.

6. A method of mixing and blending pulverulent material which comprises delivering the materials from a source of supply to a plurality of bins to produce a plurality of relatively thin horizontal layers of the material of varying analyses in the bins, and withdrawing and mixing portions of the contents of said bins proportioned to produce a final mixture of a desired analysis.

7. A method of mixing and blending pulverulent materials which comprises delivering the materials from sources of supply thereof to a plurality of groups of bins, the bins in each group receiving materials successively to form a plurality of relatively thin horizontal layers therein of varying analyses, withdrawing the materials from the bins of the several groups simultaneously, and mixing such withdrawals, and proportioning the withdrawals from the several groups of bins in such manner as to produce an ultimate mixture of a desired analysis.

8. Apparatus for mixing and blending pulverulent materials comprising the combination of a plurality of silos, conveying means for said materials including transport lines leading to each of said silos, valves in said lines controlling flow to each of the silos, and power driven means for operating the valves in sequence to cause the materials to be delivered to the silos consecutively, said means being controllable at will to vary the sequence of delivery.

9. Apparatus for mixing and blending pulverulent materials comprising the combination of a plurality of silos, conveying means for said materials including transport lines leading to each of said silos, valves in said lines controlling flow to each of the silos, and power driven means for operating the valves in sequence to cause the materials to be delivered to the silos consecutively, said means being regulable to vary the amount delivered to a silo in each interval of operation.

10. Apparatus for mixing and blending pulverulent materials comprising the combination of a plurality of silos, conveying means for said materials including transport lines leading to each of said silos, valves in said lines controlling flow to each of the silos, power driven means for operating the valves in sequence to cause the materials to be delivered to the silos consecutively, and remote control means for varying the operation of said valves at will.

11. Apparatus for mixing and blending pulverulent materials which comprises the combination of a plurality of silos, conveying means for delivering materials thereto including transport lines leading to the silos from a plurality of sources of supply, valves in the lines for controlling delivery to each silo, and means for operating the valves simultaneously in groups to cause delivery to the silos in any desired order from a plurality of sources of supply.

12. Apparatus for mixing and blending pulverulent materials which comprises the combination of a plurality of silos, conveying means for delivering materials thereto including transport lines leading to the silos from a source of supply, conveying means including transport lines inter-connecting the silos, valves controlling the delivery to each silo, and means for operating the valves in groups to bring about delivery to the silos in a selected order of materials from the source of supply and from other silos.

13. Apparatus for mixing and blending pulverulent materials which comprises the combination of a plurality of silos, conveying means for delivering materials thereto including transport lines leading to the silos from a plurality of sources of supply, conveying means including transport lines inter-connecting the silos, valves controlling the delivery to each silo, and means for operating the valves in selected groups to bring about delivery to the silos in a selected order of materials from selected other silos and sources of supply.

14. Apparatus for mixing and blending pulverulent materials which comprises the combination of a plurality of silos, conveying means for delivering materials thereto including transport lines leading to the silos from a plurality of sources of supply, valves controlling delivery to each silo, and selective operating means for the valves to bring about delivery to the silos in a selected order and from selected sources of supply.

15. Apparatus for mixing and blending pulverulent materials which comprises the combination of a plurality of silos, conveying means for delivering materials thereto including transport lines leading to the silos from a plurality of sources of supply, conveying means including transport lines leading from each silo to all the other silos and to a delivery bin, valves for controlling flow to the silos and the delivery bin, and selective operating means for the valves.

16. A method of mixing and blending dry, pulverulent materials having different characteristics, which comprises delivering the materials from a source of supply in sequence to a plurality of silos, the delivery to each of said silos being made for a predetermined interval to form a relatively thin, horizontal layer of materials therein, and to spread differences in characteristics over the number of silos available, repeating the sequence of delivery to said silos to form a plurality of layers of different characteristics in each silo and withdrawing and combining materials in a continuous stream simultaneously from a plurality of layers in a silo and delivering said materials to a receiving bin.

17. A method of mixing and blending dry, pulverulent materials having different characteristics, which comprises delivering the materials from a source of supply in sequence to a plurality of silos, the delivery to each of said silos being for a predetermined interval to form a relatively thin, horizontal layer of materials therein and to spread differences in characteristics over the number of silos available, repeating the sequence of delivery to said silos to form a plurality of layers of different characteristics in each silo and withdrawing and combining materials in a continuous stream simultaneously from a plurality of layers from a plurality of silos and delivering said materials to a receiving bin.

18. A method of mixing and blending dry, pulverulent materials having different characteristics, which comprises delivering the materials in sequence to a plurality of silos and for a predetermined interval to each silo to form a relatively thin, horizontal layer of materials therein and to spread the differences in characteristics of materials over the number of silos available, repeating the sequence of delivery to said silos to form a plurality of layers of materials of different characteristics in each silo, withdrawing and combining materials simultaneously from a plurality of layers and from a plurality of silos and delivering the withdrawn materials to a receiving bin, simultaneously withdrawing and combining materials from a plurality of layers in the remainder of the silos and returning these withdrawn materials in sequence with the materials delivered from said source.

19. A method of mixing and blending dry, pulverulent materials having different characteristics, which comprises delivering the materials from a source of supply in sequence to a plurality of silos and for a predetermined interval to each silo to form a relatively thin, horizontal layer of materials therein and to spread differences in characteristics over the number of silos available, continuously repeating the sequence of delivery to form a plurality of layers of different characteristics in each silo, withdrawing materials from said silos simultaneously from a plurality of layers therein and delivering a portion to a receiving bin and returning the remainder of the materials withdrawn to the silos in sequence with the materials delivered from said source.

20. A method of mixing and blending dry, pulverulent materials having different characteristics, which comprises delivering the materials from a source of supply in sequence to a plurality of silos and for a predetermined interval to each of said silos to form a relatively thin, horizontal layer of materials therein and to spread the differences in characteristics over the number of silos available, continuously repeating the sequence of delivery to said silos to form a plurality of layers of different characteristics in each silo, continuously withdrawing the materials from a plurality of layers in at least one of the silos and delivering the withdrawn material to a receiving bin, withdrawing materials from the remainder of the silos and returning these materials in sequence with the delivery of materials from said source.

21. A method of mixing and blending dry, pulverulent materials having different characteristics, which comprises delivering materials from a source of supply in sequence to a plurality of silos and for a predetermined interval to each of said silos to form a relatively thin, horizontal layer of materials therein and to spread differences in characteristics over the number of silos available, continuously repeating the sequence of delivery, withdrawing materials simultaneously from a plurality of layers from at least one of said silos and delivering these materials in sequence to a plurality of receiving bins and at predetermined intervals to each of said bins to form similar layers therein, at the same time withdrawing material from the remainder of the silos and returning them to the silos in sequence with materials delivered from said source.

22. A method of mixing and blending dry, pulverulent materials having different characteristics, which comprises delivering materials from a source of supply to a plurality of silos and for a predetermined interval to each of said silos to form a relatively thin, flat layer of material in each silo and to spread differences in characteristics over the number of silos available, repeating the sequence of delivery, simultaneously withdrawing materials from said silos and from a plurality of layers therein, combining the materials withdrawn and delivering them to a receiving bin, simultaneously withdrawing materials from another group of said silos and returning these materials to the silos in sequence with the delivery of materials from said source.

23. A method of mixing and blending dry, pulverulent materials having different characteristics, which comprises delivering materials from a source of supply in sequence to a plurality of silos and to each silo for a predetermined interval to form a relatively thin, horizontal layer of materials therein and to spread differences in characteristics over the number of silos available, continuously repeating the sequence of delivery, withdrawing materials simultaneously from a plurality of layers from the silos, delivering the materials withdrawn during certain intervals to a receiving bin and returning the materials withdrawn to the silos during other intervals.

24. A method of mixing and blending dry, pulverulent materials having different characteristics, which comprises delivering the materials from a source of supply in sequence to a plurality of silos and to each silo for a predetermined interval to form a plurality of relatively thin, flat layers therein and to spread differences in characteristics over the number of silos available, continuously repeating the sequence of delivery, simultaneously withdrawing materials from a plurality of layers in a plurality of said silos, delivering the materials withdrawn during certain intervals to a receiving bin and returning the materials withdrawn to the silos during other intervals in sequence with the delivery of materials from said source.

25. A method of mixing and blending dry, pulverulent materials having different characteristics, which comprises delivering materials from a source of supply in sequence to a plurality of silos and at predetermined intervals to each silo to form relatively thin, flat layers of materials therein and to spread differences in characteristics over the number of silos available, continuously repeating the sequence of delivery, simultaneously withdrawing materials from a plurality of layers in each of said silos, delivering withdrawn materials from at least one of said silos to a receiving bin during certain intervals, returning the material withdrawn from the other silos to the silos in sequence with the materials from said source during the same interval and during other intervals alternating the delivery to the receiving bin and return to the silos of the materials withdrawn from said silos.

26. A method of mixing and blending dry, pulverulent materials having different characteristics, which comprises delivering materials from a source of supply to a plurality of silos in sequence and for a predetermined interval to each silo to form relatively thin, flat layers of materials therein and to spread differences in characteristics over the number of silos available, continuously repeating the sequence of delivery, simultaneously withdrawing materials from a plurality of layers and from two groups of said silos, combining the materials withdrawn from one group and during certain intervals delivering them to a receiving bin, combining the materials withdrawn from the second group and returning them during the same intervals to the silos in sequence with the delivery of materials from said source, during other intervals returning materials from both groups to the silos in sequence with the delivery of materials from said source, and during still other intervals alternating the delivery to the receiving bin and the return to the silos of the materials withdrawn from the two groups.

27. A method of mixing and blending dry, pulverulent materials having different characteristics, which comprises delivering materials from a source of supply to a plurality of silos in sequence and for a predetermined time interval of each of said silos to form a relatively thin, flat layer of materials in each silo and to spread differences in characteristics over the number of silos available, continuously repeating this sequence of delivery, simultaneously withdrawing materials from a plurality of layers in two groups of said silos, combining the materials of each group and delivering the materials withdrawn from one group to a receiving bin during certain intervals, during the same intervals returning materials from the second group to the silos in sequence with the materials delivered from the source of supply, during other intervals alternating the delivery and return of materials and delivering materials from the second group to the receiving bin and the materials from the first group to the silos and during still other intervals returning materials withdrawn from both groups to the silos in sequence with materials from the said source.

28. A method of mixing and blending dry, pulverulent materials having different characteristics, which comprises delivering materials from a source of supply to a plurality of silos in sequence and at a predetermined time interval to each of the silos to form relatively thin, flat layers of materials therein and to spread differences in characteristics over the number of silos available, continuously repeating this sequence of delivery, simultaneously withdrawing materials from a plurality of layers from each silo of two groups, combining the materials from each group and delivering the materials in one group to a plurality of receiving bins, the said delivery being made in sequence and for a predetermined interval to each receiving bin to form similar layers, during the first named intervals returning the materials from the second group to the silos in sequence with the materials delivered from the source of supply, during other intervals alternating the delivery and return of materials by delivering the materials from the second group to the receiving bins and the materials from the first group to the silos and during still other intervals returning materials withdrawn from both groups to the silos in sequence with materials from the said source.

29. A method of mixing and blending dry, pulverulent materials having different characteristics, which comprises delivering materials from a plurality of sources of supply in sequence to a plurality of silos and at the same predetermined time intervals to each silo to form a relatively thin, horizontal layer of materials therein partially mixed by delivery at the same time, continuously repeating the sequence of delivery to said silos and withdrawing material simultaneously from a plurality of layers from at least one of said silos and delivering the withdrawn materials to a receiving bin.

30. A method of mixing and blending dry, pulverulent materials having different characteristics, which comprises delivering materials from a plurality of sources of supply in sequence to a plurality of silos, the materials from said sources being delivered to each silo at the same time and for a predetermined time interval to form a partially mixed layer of materials therein and to spread differences in characteristics over the number of silos available, continuously repeating the sequence of delivery, simultaneously withdrawing materials from a plurality of layers from each of said silos, delivering a portion to a receiving bin and returning the remainder to the silos in the same sequence with the materials from said sources.

In testimony whereof I affix my signature.

JOSEPH HUMPHREYS MORROW.